Jan. 1, 1924

C. W. METZGAR

PLATE VALVE LIFTER

Filed May 20, 1922

1,479,395

INVENTOR
Chester W. Metzgar
BY
Herbert G. Ogden
HIS ATTORNEY

Patented Jan. 1, 1924.

1,479,395

UNITED STATES PATENT OFFICE.

CHESTER W. METZGAR, OF EASTON, PENNSYLVANIA, ASSIGNOR TO INGERSOLL-RAND COMPANY, OF JERSEY CITY, NEW JERSEY, A CORPORATION OF NEW JERSEY.

PLATE-VALVE LIFTER.

Application filed May 20, 1922. Serial No. 562,372.

*To all whom it may concern:*

Be it known that I, CHESTER W. METZGAR, a citizen of the United States, and a resident of Easton, county of Northampton, and State of Pennsylvania, have invented a certain Plate-Valve Lifter, of which the following is a specification, accompanied by drawings.

This invention relates to plate valves, but more particularly to a plate valve lifter for compressor valves, by means of which a plate valve and its associated parts are lifted or held away from the seat to which the valve is applied.

The objects of the invention are to secure a simple and efficient device which will not readily get out of order for lifting a plate valve structure away from its seat, when required, and to construct the device in such manner that it may be applied to any existing type of well known plate valve.

The invention is shown in one of its preferred forms in the accompanying drawings, in which—

Figure 1:
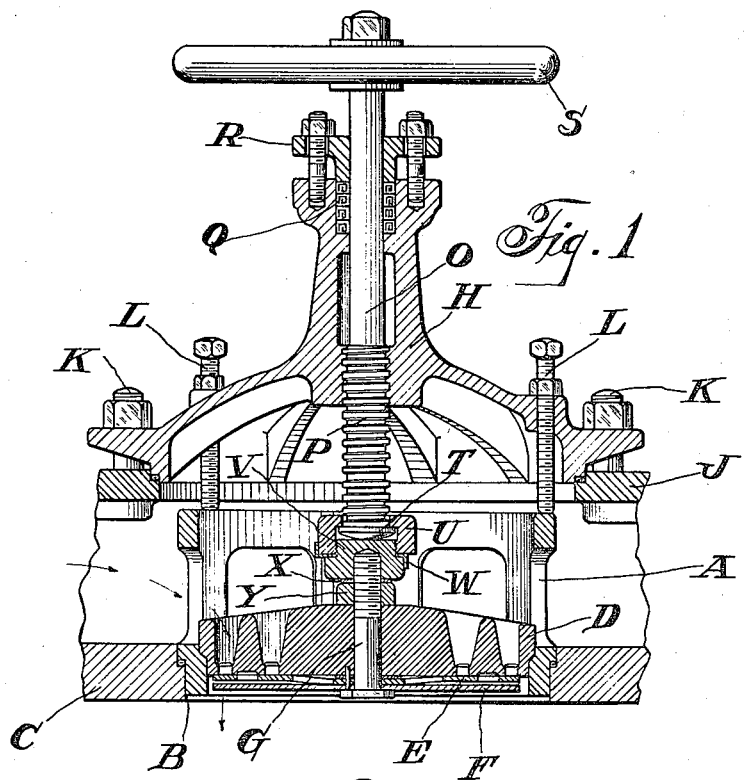
Figure 2:
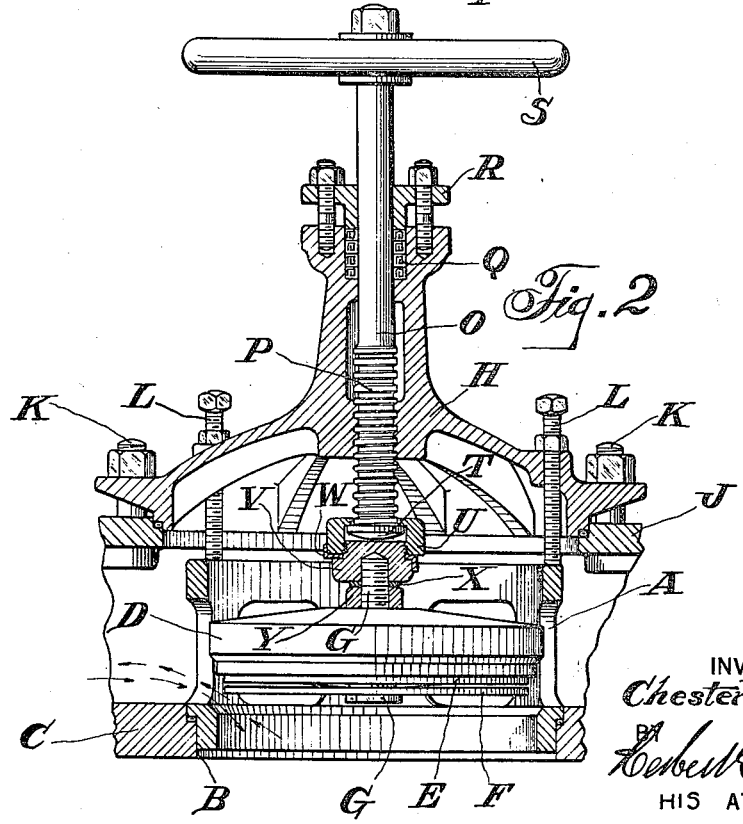

Figure 1 is a side elevation partly in longitudinal section, showing the plate valve structure in position on its seat, and Figure 2 is a similar view showing the plate valve structure lifted from its seat.

Referring to the drawings, a removable valve cage A is adapted to lie in a valve opening B in the cylinder wall C of a compressor, and a plate valve including the seat D, valve plate E, stop plate F and securing stud G are located in the cage A. The plate valve seat D is seated in the cage A, and in accordance with my invention the entire plate valve structure may be lifted from its seat in the cage A and replaced thereon as desired.

A bonnet H is adapted to be secured to the compressor outer casing J as by means of the studs K and is located over the cage A. Means are provided on the bonnet H for holding the cage A in position and in this instance set screws L are adapted to bear upon the cage A.

Manual means are carried by the bonnet and connected to the plate valve structure for lifting the plate valve and its associated parts relatively to the cage and in this instance, a valve stem O is movable in the bonnet and is provided with the screw threaded portion P engaging a similar screw threaded portion of the bonnet. The valve stem O passes through the packing Q and gland R, and is provided with the hand wheel S for manipulating the valve lifter. The inner end of the valve stem is provided with the head T which engages the lock nut U threaded to the jam nut V and held thereon by the lock plate W. The jam nut V is threaded to the end of the stud G and a lock washer X is placed between the jam nut V and the nut Y on the stud. By this means the valve stem O may be rotated without rotating the plate valve structure, but the plate valve and its associated parts will be moved relatively to the cage A.

I claim:

1. A plate valve lifter, comprising a valve cage adapted to lie in a valve opening in the cylinder wall of a compressor, a plate valve including its seat, stop plate and stud seated in said cage, a bonnet adapted to be secured to the compressor outer casing over the said cage, means on the bonnet bearing upon the cage for holding the cage in position, and manual means carried by the bonnet and connected to the plate valve structure, for lifting said plate valve and its associated parts relatively to the said cage.

2. A plate valve lifter, comprising a removable valve cage adapted to lie in a valve opening in the cylinder wall of a compressor, means on the bonnet bearing upon the cage for holding the cage in position, a plate valve including its seat, stop plate and stud seated in said cage, a bonnet adapted to be secured to the compressor outer casing over the said cage, a valve stem movable in said bonnet and engaging the said stud of the plate valve, and manual means for actuating the said stem to lift the plate valve and its associated parts relatively to the cage.

3. A plate valve lifter, comprising a valve cage adapted to lie in a valve opening in the cylinder wall of a compressor, a plate valve including its seat, stop plate and stud seated in said cage, a bonnet adapted to be secured to the compressor outer casing over the said cage, means on the bonnet for holding the cage in position, a valve stem movable in said bonnet and engaging the said stud of the plate valve, and manual means for actuating the said stem to lift the plate valve and its associated parts relatively to the cage.

In testimony whereof I have signed this specification.

CHESTER W. METZGAR.